(12) United States Patent
Vanderhaegen et al.

(10) Patent No.: US 9,438,394 B2
(45) Date of Patent: Sep. 6, 2016

(54) HIERARCHICAL AND ADAPTIVE MULTI-CARRIER DIGITAL MODULATION AND DEMODULATION

(71) Applicant: Alcatel-Lucent, Paris (FR)

(72) Inventors: Dirk Vanderhaegen, Wemmel (BE); Danny Van Bruyssel, Bonheiden (BE); Jochen Maes, Veerle (BE); Koen De Schepper, Edegem (BE); Michael Timmers, Herent (BE)

(73) Assignee: Alcatel Lucent, Boulogne-Billancourt (FR)

( * ) Notice: Subject to any disclaimer, the term of this patent is extended or adjusted under 35 U.S.C. 154(b) by 115 days.

(21) Appl. No.: 14/350,388

(22) PCT Filed: Oct. 9, 2012

(86) PCT No.: PCT/EP2012/069955
§ 371 (c)(1),
(2) Date: Apr. 8, 2014

(87) PCT Pub. No.: WO2013/060571
PCT Pub. Date: May 2, 2013

(65) Prior Publication Data
US 2014/0241378 A1 Aug. 28, 2014

(30) Foreign Application Priority Data

Oct. 25, 2011 (EP) .................................. 11306381

(51) Int. Cl.
*H04L 27/26* (2006.01)
*H04L 5/00* (2006.01)
(Continued)

(52) U.S. Cl.
CPC ........... *H04L 5/0046* (2013.01); *H04L 1/0003* (2013.01); *H04L 27/3488* (2013.01); *Y02B 60/31* (2013.01)

(58) Field of Classification Search
CPC . H04L 5/0053; H04L 1/0038; H04L 1/0046; H04L 1/0072; H04L 1/0047; H04L 27/2627; H04L 27/2649; H04L 5/0007; H04W 24/02
See application file for complete search history.

(56) References Cited

U.S. PATENT DOCUMENTS

2004/0240415 A1 12/2004 Lane
2005/0286654 A1* 12/2005 Tanrikulu .............. H04L 1/0055
375/316

(Continued)

FOREIGN PATENT DOCUMENTS

| CN | 101136892 (A) | 3/2008 |
|---|---|---|
| CN | 101325474 (A) | 12/2008 |
| EP | 1 605 597 A1 | 12/2005 |

OTHER PUBLICATIONS

Wu et al., Scalable Video Coding and Transport Over Broad-Band Wireless Networks, Proceedings of the IEEE, vol. 89, No. 1, Jan. 2001.

(Continued)

*Primary Examiner* — Fan Ng
(74) *Attorney, Agent, or Firm* — Harness, Dickey & Pierce, P.L.C.

(57) ABSTRACT

In an embodiment the method includes, at a transmit side, grouping carriers into carrier groups, and selecting a group constellation diagram for modulation of the carriers of a given carrier group. The selected group constellation diagram is built as a hierarchical sum of I super-imposed constellations vectors having predefined decreasing powers with the P strongest and the Q weakest constellation vectors being omitted. The carriers of the carrier group are modulated by means of the selected group constellation diagram, and P and/or Q parameters per carrier group and per multi-carrier data symbol are adjusted.

14 Claims, 7 Drawing Sheets

(51) Int. Cl.
  *H04L 1/00* (2006.01)
  *H04L 27/34* (2006.01)

(56) References Cited

U.S. PATENT DOCUMENTS

| | | | |
|---|---|---|---|
| 2009/0168922 A1* | 7/2009 | Malladi | H04W 72/042 375/316 |
| 2011/0044269 A1* | 2/2011 | Fan | H04B 1/7105 370/329 |
| 2011/0164707 A1* | 7/2011 | Luo | H04L 1/0045 375/341 |
| 2011/0255467 A1* | 10/2011 | Larsson | H04L 1/0026 370/328 |

OTHER PUBLICATIONS

Lee et al., Allocation of Layer Bandwidths and FECS for Video Multicast Over Wired and Wireless Networks, IEEE Transaction on Curcuits and Systems for Video Technology, IEEE Service Center, vol. 12, No. 12, Dec. 2002, pp. 1059-1070.

May 5, 2016 Chinese Office Action issued in corresponding Chinese Application No. 201280052420.3.

* cited by examiner

HIERARCHICAL AND ADAPTIVE MULTI-CARRIER DIGITAL MODULATION AND DEMODULATION

This application is a national phase under 35 U.S.C. §371 of PCT International Application No. PCT/EP2012/069955 which has an International filing date of Oct. 9, 2012, which claims priority to European patent application number EP11306381.2 filed Oct. 25, 2011; the entire contents of each of which are hereby incorporated by reference.

TECHNICAL FIELD OF THE INVENTION

The present invention relates to digital modulation and demodulation of multi-carrier signals.

TECHNICAL BACKGROUND OF THE INVENTION

After their first introduction in the early 1990s, wireline broadband networks, which includes fiber, coaxial cable and twisted pair, have evolved substantially. Despite the inherent attenuation of copper which limits the capacity, transmission over this medium remains attractive as it is abundantly present throughout the world, due to legacy Plain Old Telephony Service (POTS) deployment. Hence, broadband over copper offers substantial deployment cost savings as compared to Fiber-To-The-Home (FTTH). Indeed, while FTTH has been technologically viable since 1988, Digital Subscriber Line (DSL) remains the predominant broadband access technology for the residential market. However, as the access network remains the bottleneck in the end-to-end connection and due to the continuing demand for ever higher data rates, copper is being replaced by fiber step-by-step. The cost per user of fiber deployment increases substantially when moving closer to the subscriber premises. This is why different operators have expressed enthusiasm with recent technologies, such as phantom mode and vectoring, which hold the promise of delivering more than 300 Mb/s. The success of vectoring and phantom mode transmission triggered interest in a next-generation broadband copper access beyond vectored vDsL2 to deliver 500 Mb/s to 1 Gb/s over relatively short loops.

Discrete Multi-Tone (DMT) modulation remains one of the prominent candidates for next generation access networks. Indeed, DMT is very flexible in the frequency domain and especially suited for spectral confinement, which is important when moving to higher bandwidths, where additional notching is required. Furthermore, as any other multi-carrier based modulation, the frequency selectivity of the channel can easily be addressed by very basic single tap equalizers.

However, Digital Subscriber Line (DSL) is not so robust against transient noise: DSL communications assume a quasi-stable channel and noise environment, and no standardized mechanism is foreseen to cope with fast channel variations.

In current DSL standards, the receiver determines the respective carrier bit loadings and gains based on Signal Noise plus Interference Ratio (SNIR) measurements carried out during channel initialization, and reports back these parameters for use by the transmitter. The receiver is also responsible for protecting against slow channel variations during showtime by means of bit swap, Seamless Rate Adaptation (SRA) or Save Our Showtime (SOS) procedures. Any noise fluctuation above the measured noise floor has to be masked with a noise margin, or with virtual noise.

Typically, operators use noise margins from 5 to 15 dB on top of the line code limit, which represents a loss of about 10% to 40% in terms of achievable data rate. Noise bursts still above the noise margin are expected to be infrequent and short in duration (so-called impulsive noise), and hence can be corrected by means of Forward Error Correction (FEC) combined with data interleaving (at the expense of communication latency and data overhead), or by means of Automatic Repeat reQuest (ARQ).

With vectoring, the crosstalk interference levels at the receivers are considerably reduced. Therefore, substantial noise variations, previously masked by a high and stable crosstalk level, will become visible. Hence, operators may require even larger noise margins to cope with this increase in noise dynamics, thereby reducing the projected vectoring gain.

Still further, due to continued fiber deployment, which reduces the length of the copper loops, DSL band plans are extended to higher frequencies. These frequencies have higher crosstalk coupling, but also stronger pickup of non DSL noises such as Radio Frequency Ingress (RFI). Also here, we can expect an increase in noise dynamics.

Also, there is a constant push by operators for reducing the overall power consumption of the access plant. Power reduction is also a 'fairness' mechanism that could allow loop unbundling.

In short, current DSL systems are not able to provide end-users with optimal data rates at a right Quality of Service (QoS), and with optimal power per bit.

SUMMARY OF THE INVENTION

It is an object of the present invention to propose a new modulation and demodulation scheme that addresses the aforementioned shortcomings and drawbacks.

In accordance with a first aspect of the invention, a method for encoding a binary stream into multi-carrier data symbols comprises the steps, at a transmit side, of:
a) grouping carriers into carrier groups, each of the carrier groups comprising a plurality of carriers;
b) for a given carrier group comprising N carriers, selecting a group constellation diagram for modulation of the N carriers of the carrier group, the selected group constellation diagram being built as a hierarchical sum of I super-imposed constellations vectors having predefined decreasing powers with the P strongest and the Q weakest constellation vectors being omitted, P and Q being two positive integer parameters, I being a positive integer value that determines a maximum constellation size;
c) for a given carrier of the carrier group, mapping a binary word onto a constellation point of the group constellation diagram;
d) iterating through step c) for N binary words with respective ones of the N carriers of the carrier group, P and Q parameters remaining unchanged; and
e) iterating through steps b) to d) for each carrier group, P and/or Q parameters being adjusted per carrier group and per multi-carrier data symbol.

In accordance with a second aspect of the invention, a transmitter for encoding a binary stream into multi-carrier data symbols is configured:
a) to group carriers into carrier groups, each of the carrier groups comprising a plurality of carriers;
b) for a given carrier group comprising N carriers, to select a group constellation diagram for modulation of the N carriers of the carrier group, the selected group constellation diagram being built as a hierarchical sum of I super-imposed constellations vectors having predefined decreasing powers with the P strongest and the Q weakest constellation vectors being omitted, P and Q being two positive integer parameters, I being a positive integer value that determines a maximum constellation size;

c) for a given carrier of the carrier group, to map a binary word onto a constellation point of the group constellation diagram;

d) to iterate through step c) for N binary words with respective ones of the N carriers of the carrier group, P and Q parameters remaining unchanged; and e) to iterate through steps b) to d) for each carrier group, and to adjust P and/or Q parameters per carrier group and per multi-carrier data symbol.

In accordance with a third aspect of the invention, a method for blindly decoding a binary stream from multi-carrier data symbols comprises the steps, at a receive side, of:

a) grouping carriers into carrier groups, each of the carrier groups comprising a plurality of carriers;

b) for a given carrier group comprising N carriers, selecting a group constellation diagram for demodulation of the N carriers of the carrier group by statistical characterization of the N carriers or part thereof, the selected group constellation diagram being built as a hierarchical sum of I super-imposed constellations vectors having predefined decreasing powers with the P strongest and the Q weakest constellation vectors being omitted, P and Q being two positive integer parameters, I being a positive integer value that determines a maximum constellation size;

c) for a given carrier of the carrier group, de-mapping the carrier into a binary word by means of the group constellation diagram;

d) iterating through step c) for each one of the N carriers of the carrier group, P and Q parameters remaining unchanged, thereby yielding N binary words; and e) iterating through steps b) to d) for each carrier group, P and/or Q parameters being re-evaluated per carrier group and per multi-carrier data symbol.

In accordance with a fourth aspect of the invention, a receiver for blindly decoding a binary stream from multi-carrier data symbols is configured:

a) to group carriers into carrier groups, each of the carrier groups comprising a plurality of carriers;

b) for a given carrier group comprising N carriers, to select a group constellation diagram for demodulation of the N carriers of the carrier group by statistical characterization the N carriers or part thereof, the selected group constellation diagram being built as a hierarchical sum of I super-imposed constellations vectors having predefined decreasing powers with the P strongest and the Q weakest constellation vectors being omitted, P and Q being two positive integer parameters, I being a positive integer value that determines a maximum constellation size;

c) for a given carrier of the carrier group, to de-map the carrier into a binary word by means of the group constellation diagram;

d) to iterate through step c) for each one of the N carriers of the carrier group, P and Q parameters remaining unchanged, thereby yielding N binary words; and e) to iterate through steps b) to d) for each carrier group, and to re-evaluate P and/or Q parameters per carrier group and per multi-carrier data symbol.

In one embodiment of the invention, the transmitter adjusts P parameter according to a power budget criterion.

In one embodiment of the invention, the transmitter adjusts Q parameter according to a noise criterion.

In one embodiment of the invention, the transmitter adjusts Q parameter according to acknowledgment information from a peer receiver.

In one embodiment of the invention, the transmitter adjusts P and/or Q parameters according to a Quality of Service QoS criterion.

In one embodiment of the invention, the transmitter adjusts P and/or Q parameters according to the outgoing traffic demand.

In one embodiment of the invention, the I super-imposed constellation vectors are 4-QAM vectors.

In one embodiment of the invention, carrier transmit powers are individually shaped in accordance with a transmit power spectral mask and/or are individually fine-tuned according to respective relative carrier gains.

In one embodiment of the invention, the method further comprises the step of scrambling the binary stream before mapping onto the carriers.

In one embodiment of the invention, the receiver evaluate P and/or Q parameter by statistical characterization of the power or amplitude distribution of the N carriers or part thereof.

The proposed modulation scheme groups the carriers into carrier groups, each carrier group comprising two or more carriers. A sufficiently large number of carriers is however required for accurate statistical characterization of the carriers at the receive side. The carriers can be grouped according to their respective SNIR or error ratio. Such carrier grouping can be performed during channel initialization, and can be updated during channel operation. Alternatively, the carrier groups can be predefined groups known at both the transmit and the receive sides. The carrier groups do not necessarily comprise an equal number of carriers.

Then, the transmitter autonomously selects a common constellation diagram to be used for all the carriers of a given carrier group, and for a given multi-carrier data symbol. The transmitter uses a sufficiently restricted set of power levels and possible constellation patterns. The transmitter is then allowed to use, at any point of time, any constellation and power within this restricted set. These actions are coordinated over the full group of carriers, and the receiver can apply some metrics over the group of carriers to detect reliably which constellation is being used at which power.

More formally, the selected constellation diagram is built as a hierarchical sum of I super-imposed constellations vectors having predefined decreasing powers with the P first strongest and the Q last weakest constellation vectors being omitted. For example, the super-imposed constellation vectors are 4-QAM constellation vectors, or antipodal PAM constellation vectors. I determines a maximum allowed constellation size, while P and Q are two integer parameters, the value of which is autonomously adjusted by the transmitter.

The transmitter autonomously adjusts P and Q parameters according to various criteria. For example, P parameter can be increased to consume as little transmit power as possible. Still for example, Q parameter can be increased to stay away from the noise floor and make the communication as resilient as possible. Still for example, Q parameter can be adjusted according to acknowledgment information received from the peer receiver: if the weakest constellation vectors are hit by a sudden noise increase, the corresponding data blocks remains unacknowledged and the transmitter may then decide to increase Q value for the corresponding carrier group(s). Still for example, P and/or Q parameters can be adjusted so as to meet a certain QoS, such as a certain data throughput with a certain Bit Error Rate (BER). P and/or Q parameter can also be adjusted so as to meet the actual traffic demand without wasting power for idle pattern transmission as per current DSL standards.

The transmitter next encodes a corresponding number of bits over each and every carrier of the carrier group using the same constellation diagram, meaning with P and Q parameters remaining unchanged.

The process re-iterates for each and every carrier group, and for each and every multi-carrier data symbol, while P and Q parameters are adjusted to their optimal value per carrier group and per multi-carrier data symbol.

The carrier transmit powers may be individually shaped according to a transmit power mask, or may be fine-tuned according to respective relative carrier gains, e.g. for noise margin equalization.

The use of a common constellation diagram over a pre-determined group of carriers allows blind decoding at the receive side. The receiver finds out which constellation diagram has been used at the transmit side by statistically characterizing the received frequency-samples of a given carrier group, for instance by statistically characterizing the amplitude or power of the received frequency-samples versus some reference threshold. Not all frequency-samples need to be used, yet the more samples the more accurate the estimation. Also, the statistical characterization is improved by scrambling the data before encoding.

Once P and Q values have been determined and a corresponding constellation diagram selected, the receiver decodes the corresponding received frequency-samples by selecting the closest constellation point within the constellation diagram, which point being associated with a particular binary word.

The proposed modulation and demodulation scheme is advantageous in that:
  it does not require to use margin with respect to the line code limit, neither to use virtual or artificial noise, to guarantee QoS and stability;
  unlike current DSL ARQ, it can cope with longer noise bursts and fast stepwise noise increase;
  unlike current DSL low power mode, it can adapt its transmit power in function of the actual traffic demand, and therefore can save much more power; for traffic increase, the power surge can be controlled;
  it would allow to start up a line within seconds compared to 30 s–3 nm for a large vectoring system;
  the amount of line retrains is considerably reduced;
  it reduces network management as less communication parameters need to be manually configured, and thus reduce the Operational Expenditures (OPEX);
  it allows loop unbundling.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

The following terminology will be consistently used throughout the description:
  I denotes the maximum number of hierarchical modulation layers, or alternatively the maximum number of constellation vectors, that can potentially be used by the transmitter and the receiver;
  i denotes a modulation layer index, or alternatively a constellation vector index, ranging from 0 to I−1;
  $L_i$ denotes a particular modulation layer characterized by a particular predefined transmit power;
  J denotes the total number of carrier groups;
  j denotes a carrier group index ranging from 0 to J−1;
  $G_j$ denotes the carrier group with index j;
  $N_j$ denotes the number of carriers within the carrier group $G_j$;
  K denotes the total number of carriers;
  k denotes a carrier or frequency index ranging from 1 to K;
  l denotes a transmit or receive multi-carrier data symbol index,
  $V_{i,k,l}$ denotes the transmit constellation vector at frequency index k for modulation layer $L_i$ and multi-carrier data symbol l,
  $P_{j,l}$ denotes the number of strongest constellation vectors, or alternatively the number of highest modulation layers, omitted within carrier group $G_j$ for multi-carrier data symbol index l;
  $Q_{j,l}$ denotes the number of weakest constellation vectors, or alternatively the number of lowest modulation layers, omitted within carrier group $G_j$ for multi-carrier data symbol index l;
  $T_{k,l}$ denotes the transmit frequency-sample at frequency index k for multi-carrier data symbol index l;
  $R_{k,l}$ denotes the receive frequency-sample at frequency index k for multi-carrier data symbol index l;
  $H_k$ denotes the overall direct channel transfer function at frequency index k; and
  $Z_{k,l}$ denotes the received noise and interference at frequency index k for multi-carrier data symbol index l;

It will be further assumed that the hierarchical modulation layers are 4-QAM modulation layers, and so are the corresponding constellation vectors.

Figure 1:
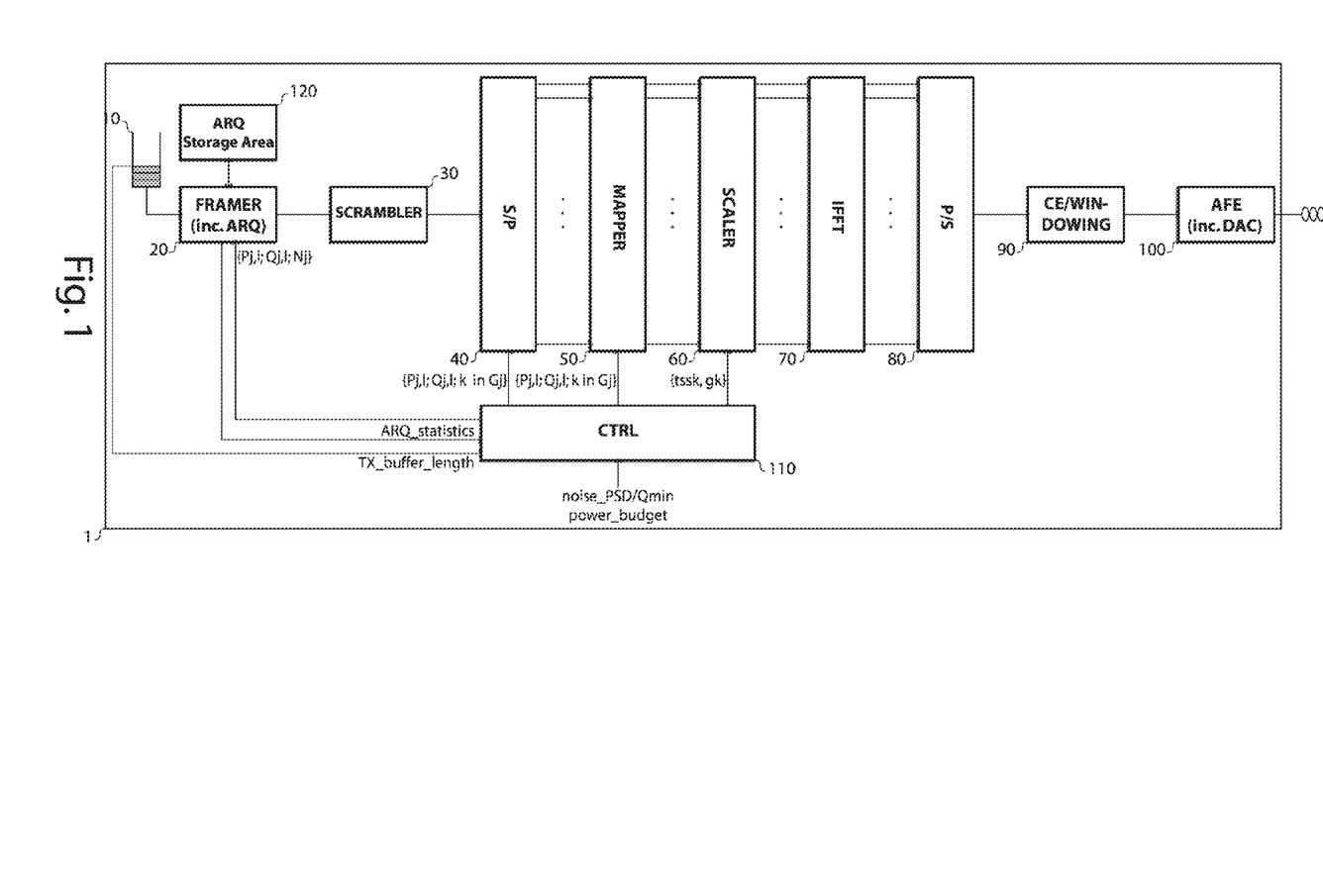
FIG. 1 represents a transmitter according to the invention.

There is seen in FIG. 1 a transmitter 1 comprising the following functional blocks:
  a transmit buffer 10, wherein outgoing traffic is held,
  a framer 20,
  a scrambler 30,
  a serial-to-parallel (S/P) converter 40,
  a mapper 50,
  a scaler 60,
  an Inverse Fast Fourier Transform (IFFT) unit 70,
  a parallel-to-serial (P/S) converter 80,
  a Cyclic Extension (CE) and windowing unit 90,
  an Analog Front End (AFE) 100,
  a modulation controller (CTRL) 110,
  an ARQ storage area 120.

The transmit buffer 10 is coupled to the framer 20. The framer 20 is further coupled to the scrambler 30 and to the ARQ storage area 120. The scrambler 30 is further coupled to the S/P converter 40. The S/P converter 40 is further coupled to the mapper 50. The mapper 50 is further coupled to the scaler 60. The scaler 60 is further coupled to the IFFT unit 70. The IFFT unit 70 is further coupled to the P/S converter 80. The P/S converter 80 is further coupled to the CE/windowing unit 90. The CE/windowing unit 90 is further coupled to the AFE 100. The AFE 100 is further coupled to a transmission medium, such as an Unshielded Twisted copper Pair (UTP). The modulation controller 110 is coupled to the transmit buffer 10, to the framer 20, to the S/P converter 40, to the mapper 50, and to the scaler 60.

The framer 20 parses the outgoing binary stream into Data Transmission Units (DTU). Each DTU is conveyed over a given modulation layer of a given carrier group within a given multi-carrier data symbol, further referred as a data block (see FIG. 6).

The framer 20 is supplied with the number Nj of carriers within carrier group Gj, as well as with modulation parameters $\{P_{j,l}; Q_{j,l}\}$. The length of a data block within carrier group Gj is thus equal to 2Nj, and there are I-$P_{j,l}$-$Q_{j,l}$ enabled data blocks per carrier group. The framer 30 picks up a required number of bits from the outgoing binary stream so as to match the length of a given data block after overhead insertion. The DTU overhead comprises parity information, such as Cyclic Redundancy Check (CRC) or Forward Error Control (FEC), and data re-assembling information. The process re-iterates for each enabled data block within each carrier group and each multi-carrier data symbol.

The framer 20 also accommodates ARQ logic for re-transmitting DTus that have not been acknowledged by the peer receiver. The framer 20 makes use of a storage area 120, wherein the unacknowledged DTus are held for further re-transmission, if any.

The framer 20 is further configured to keep ARQ statistics about transmission failures per enabled data block, for instance how many DTus transmitted over a specific data block were not acknowledged. The ARQ statistics are supplied to the modulation controller 110 for adjusting modulation parameter $Q_{j,l}$.

The scrambler 30 is for randomizing a binary stream by means of a scrambling algorithm known at both transmit and receive side.

The S/P converter 40 maps each scrambled DTU into a given data block of a given multi-carrier data symbol according to a pre-determined order. The S/P converter 40 provides the mapper 50 with respective bit pair values $\{b0,i,k,l; b1,i,k,l\}$ to be mapped on 4-QAM hierarchical layer Li for modulation of carrier index k within multi-carrier data symbol index l. The S/P converter 40 is supplied with modulation parameters $\{P_{j,l}; Q_{j,l}\}$ to be used by the mapper 50 for carrier group Gj and multi-carrier data symbol index l. The S/P converter 40 is further supplied with the list of carrier indexes belonging to carrier group Gj (see "k in Gj" in FIG. 1).

The mapper 50 determines transmit frequency-samples from the respective bit pair values supplied by the S/P converter 40.

The transmit frequency-sample $T_{k,l}$ at frequency index k, which belongs to carrier group Gj, and within multi-carrier data symbol index l, can be decomposed as a hierarchical sum of I super-imposed 4-QAM constellation vectors $V_{i,k,l}$ having predefined decreasing powers, with the $P_{j,l}$ strongest and $Q_{j,l}$ weakest constellation vectors being omitted (the S/P converter 30 is not expected to output any bit-pair values for them). Each constellation vectors $V_{i,k,l}$ is modulated by the respective bit pair values $\{b0,i,k,l; b1,i,k,l\}$, and L-$P_{j,l}$-$Q_{j,l}$ constellation vectors are summed up to yield the transmit frequency-sample $T_{k,l}$:

$$T_{k,l} = \sum_{i=0}^{I-1} V_{i,k,l} = \sum_{i=P_{j,l}}^{I-1-Q_{j,l}} V_{i,k,l}, \quad (1)$$

with $k \in Gj$.

In a preferred embodiment, the I constellation vectors $V_{i,k,l}$ have fixed decreasing power by an equal power factor $\alpha$:

$$\|V_{i,k,l}\|^2 = \frac{\|V_0\|^2}{\alpha^i}, \quad (2)$$

wherein $\|V_0\|$ denotes a reference amplitude for the strongest constellation vector to be commonly used by both the transmitter and the receiver. A typical value for $\alpha$ is 2 or 4.

The mapper 50 outputs a set of frequency samples $T_{k,l}$ towards the scaler 60.

The scaler 60 shapes the transmit power of the frequency samples $T_{k,l}$ by means of a transmit Power Spectral Density (PSD) mask $tss_k$, and/or fine-tunes the transmit power of the frequency samples $T_{k,l}$ according to respective relative carrier gain $g_k$, thereby yielding scaled transmit frequency-samples $T'_{k,l}$:

$$T'_{k,l} = tssi_k \cdot g_k \cdot T_{k,l} \quad (3).$$

The IFFT unit 70 is for computing time samples from the scaled transmit frequency samples $T'_{k,l}$ by means of the IFFT algorithm.

The P/S converter 80 is for converting the time samples supplied by the IFFT unit 70 into a serial time sequence for further analog conversion.

The CE/windowing unit 90 is for inserting a Cyclic Prefix within each multi-carrier data symbol, and further for applying a time-window over each multi-carrier data symbol so as to reduce frequency leakage during symbol transition.

The AFE 100 comprises a Digital-to-Analog Converter (DAC), a transmit filter for confining the signal energy within the appropriate communication frequency band(s), a line driver for amplifying the transmit signal and for driving the transmission line, an hybrid for coupling the transmitter output to the transmission line while achieving low transmitter-receiver coupling ratio (e.g., by means of echo cancellation techniques), impedance-matching circuitry for adapting to the characteristic impedance of the line, and isolation circuitry (typically a transformer).

The modulation controller 110 is for adjusting the values of the modulation parameters $\{P_{j,l}; Q_{j,l}\}$ to be used by the mapper 50 for carrier group Gj and multi-carrier data symbol index l.

The modulation parameters $\{P_{j,l}; Q_{j,l}\}$ are adjusted according to various criteria:
- a power policy criterion power_policy, such as minimum transmit power to achieve a required QoS, or maximum transmit power to make communication as resilient as possible;
- a QoS criterion, such as a given Constant Bit Rate (CBR) or variable Bit Rate (VBR) to be achieved with a given BER and/or latency;
- acknowledgment information ack_info from the framer 30, such as the number of re-transmission events per modulation layer and per carrier group;
- a noise criteria, such as a PSD template noise_template as configured by a network analyzer, or SNIR measurements carried out by the peer receiver during channel initialization and/or operation, or alternatively a minimal value for Q parameter to be complied with for a given carrier group as determined from SNIR measurements carried out by the peer receiver during channel initialization and/or operation; and the current length of the transmit buffer 10, which is indicative of the actual traffic demand from the higher layer(s).

The modulation controller 110 adjusts Pj,l and Qj,l modulation parameters within the following bounds:

$$0 \le P_{j,l} \le I \quad (4),$$

$$0 \le Q_{j,l} \le I \quad (5),$$

$$I - P_{j,l} - Q_{j,l} \ge 0 \quad (6).$$

If either Pj,l+Qj,l is equal to I, then the corresponding carrier group Gj is not used for transmission.

P and/or Q parameters may be constrained to follow some pre-determined template or rule. For instance, P parameter variation over time can be bounded so as to smooth interferences towards other active lines. Still for instance, during channel initialization, the transmitter may be constrained to start with high transmit power and high noise margin, meaning low P and high Q values, so as to set up a basic and resilient communication channel as quickly as possible. The transmitter is then allowed to gradually decrease power and noise margin in conformance with the template and the required QoS.

Adjustment of modulation parameters {Pj,l; Qj,l} will be further elaborated with regard to FIGS. 6 and 7.

Figure 2:
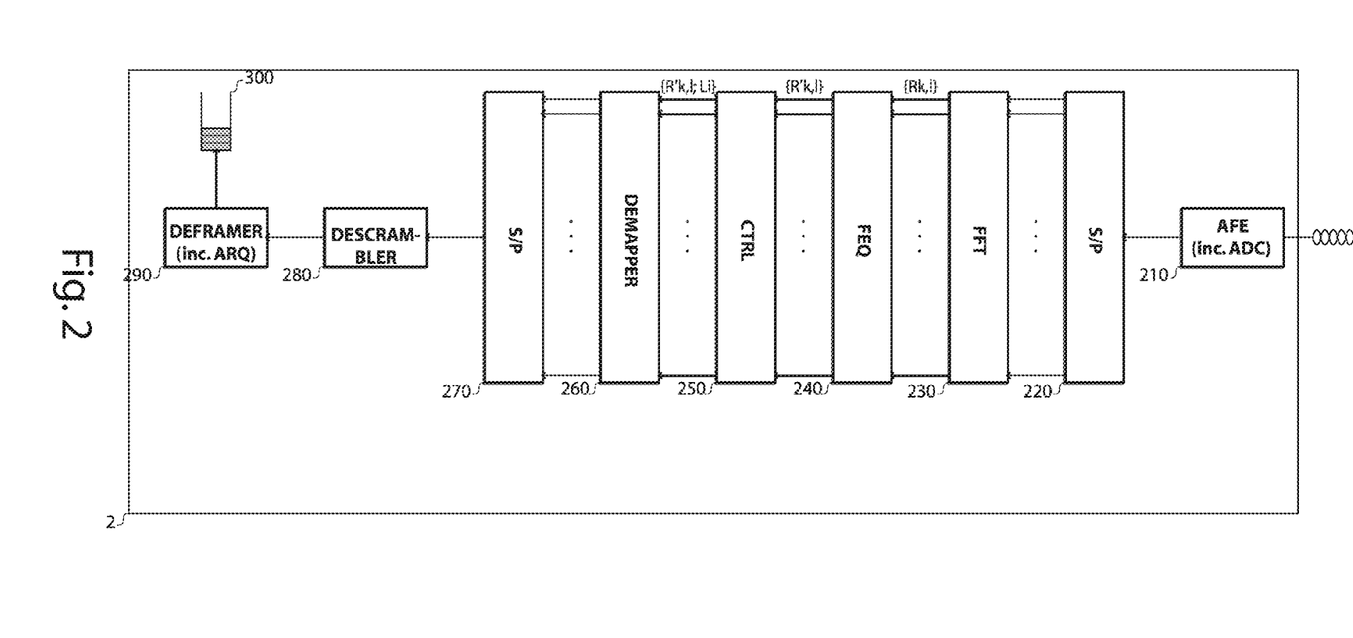
FIG. 2 represents a receiver according to the invention.

There is seen in FIG. 2 a receiver 2 comprising the following functional blocks:

an AFE 210,
a S/P converter 220,
a Fast Fourier Transform (FFT) unit 230,
a Frequency Equalizer (FEQ) 240,
a demodulation controller (CTRL) 250,
a demapper 260,
a P/S converter 270,
a descrambler 280, and
a deframer 290,
a receive buffer, wherein incoming traffic is held 300, The AFE 210 is coupled to the transmission medium and to the S/P converter 220. The S/P converter 220 is further coupled to the FFT unit 230. The FFT unit 230 is further coupled to the frequency equalizer 240. The frequency equalizer 240 is further coupled to the demodulation controller 250. The demodulation controller 250 is further coupled to the demapper 260. The demapper 260 is further coupled to the P/S converter 270. The P/S converter 270 is further coupled to the descrambler 280. The descrambler 280 is further coupled to the deframer 290. The deframer 290 is further coupled to the receive buffer 300.

The AFE 210 comprises isolation circuitry, impedance-matching circuitry, a hybrid for coupling the transmission line to the receiver input while achieving low transmitter-receiver coupling ratio, a receive filter for confining the signal energy within the appropriate communication frequency bands while rejecting out-of-band interferences, a Low Noise Amplifier (LNA) for amplifying the receive signal with as little noise as possible, and an Analog-to-Digital Converter (ADC).

The S/P converter 220 is for parallelizing the digital time samples output by the AFE 210 for further processing by the FFT unit 230.

The FFT unit 230 is for computing the received frequency-samples Rk,l by means of the Fast Fourier Transform algorithm.

The equalizer 240 is for equalizing the receive frequency-samples. Each frequency-sample Rk,l is multiplied by the inverse of the overall channel transfer function (inc. carrier scaling and AFE 100 and AFE 210) so as to recover the initial transmit frequency sample Tk,l, thereby yielding equalized frequency samples R'k,l:

$$R_{k,l} = H_k \cdot T_{k,l} + Z_{k,l} \quad (7), \text{ and}$$

$$R'_{k,l} = H_k^{-1} \cdot R_{k,l} = T_{k,l} + H_k^{-1} \cdot Z_{k,l} \quad (8).$$

A pseudo-random wide-band signal known at both transmit and receive side can be used to determine the channel transfer function. The pseudo-random signal can be transmitted as a preamble pattern preceding every data transmission, or as a training signal during channel initialization and/or operation.

The equalized receive frequency samples R'k,l are supplied to the demodulation controller 250 for determination of modulation parameters.

The demodulation controller 250 determines the modulation parameters {Pj,l; Qj,l} for a carrier group Gj and a multi-carrier data symbols index l by statistically characterizing the equalized receive frequency-samples R'k,l, k∈Gj.

The demodulation controller 250 computes the average power of the Nj equalized receive frequency-samples R'k,l. An estimate Pj,l of the mean power of the Nj receive frequency-samples for carrier group Gj and multi-carrier data symbol index l is given by:

$$P_{j,l} = \frac{1}{N_j} \sum_{k \in G_j} \|R'_{k,l}\|^2. \quad (9)$$

As each 4-QAM constellation vector Vi,k,l is modulated with statistically uncorrelated bit pair values (on account of the scrambling process), and assuming zero-mean Gaussian noise Zk,l, the expected value of the average power is given by:

$$E(\|R'_{k,l}\|^2) = E(R'_{k,l} \cdot R'_{k,l}*) = \quad (10)$$
$$E((T_{k,l} + H_k^{-1} \cdot Z_{k,l}) \cdot (T_{k,l} + H_k^{-1} \cdot Z_{k,l})*)$$
$$= E(T_{k,l} \cdot T_{k,l}*) = E\left(\left(\sum_{i=P_{j,l}}^{I-1-Q_{j,l}} V_{i,k,l}\right) \cdot \left(\sum_{i=P_{j,l}}^{I-1-Q_{j,l}} V_{i,k,l}\right)*\right)$$
$$= \sum_{i=P_{j,l}}^{I-1-Q_{j,l}} E(\|V_{i,k,l}\|^2) = \sum_{i=P_{j,1}}^{I-1-Q_{j,l}} \frac{\|V_0\|^2}{\alpha^i}.$$

Assuming reference transmit power $\|V_0\|$ is known at the receive side, the demodulation controller 250 determines modulation parameters {Pj,l; Qj,l} whose sum (10) best fits the computed estimate Pj,l (9).

The demodulation controller 250 first determines whether the strongest constellation vector has been used (i.e., whether P is equal to zero) by comparing the estimate Pj,l to a first reference threshold between $$\sum_{i=1}^{I-1} \frac{\|V_0\|^2}{\alpha^i} \text{ and } \sum_{i=0}^{I-1} \frac{\|V_0\|^2}{\alpha^i},$$

for instance $$\sum_{i=1}^{I-1} \frac{\|V_0\|^2}{\alpha^i} + \frac{\|V_0\|^2}{2}.$$

If the estimate Pj,l is greater than the first reference threshold, then P is deemed to be zero and the Nj receive frequency-samples of carrier group Gj are sent to the demapper 260 for demodulation of the highest modulation layer L0. The demapper 260 determines the strongest constellation vector V0,k,l that was transmitted for each carrier k of the carrier group Gj. The so-determined constellation vectors V0,k,l are then subtracted from the respective receive frequency-sample R'k,l, and the resulting receive frequency-samples are returned to the demodulator controller 250 for further statistical characterization.

If the estimate Pj,l is lower than the first reference threshold, then P is deemed to be different from 0, meaning the modulation layer L0 was not used at the transmit side for that carrier group, and the estimate Pj,l is compared with a second reference threshold between $$\sum_{i=2}^{I-1} \frac{\|V_0\|^2}{\alpha^i} \text{ and } \sum_{i=1}^{I-1} \frac{\|V_0\|^2}{\alpha^i},$$

for instance $$\sum_{i=2}^{I-1} \frac{\|V_0\|^2}{\alpha^i} + \frac{\|V_0\|^2}{2\alpha},$$

so as to figure out whether modulation layer L1 was used or not.

Once a particular reference threshold is hit for a corresponding modulation layer (typically, layer index Pj,l), then a corresponding value for modulation parameter Pj,l is determined, and the successive hierarchical modulation layers are individually demodulated, and the corresponding constellation vectors subtracted from the received frequency samples, till a further reference threshold for a further corresponding modulation layer (typically, layer index L−1−Qj,l) is no longer hit (at that stage, only noise is expected to remain). A corresponding value for Qj,l parameter is then derived.

The demapper 260 is for demodulating a given modulation layer Li of a given frequency-sample (see {R'k,l; Li} in FIG. 2). The frequency sample is supplied by the demodulation controller 250 after subtraction of the previously demodulated constellation vectors, if any. The demapper 260 selects the 4-QAM constellation diagram corresponding to modulation layer Li, and determines the constellation point of that constellation diagram that is closest to the supplied frequency-sample. The bit-pair value corresponding to that constellation point is then output by the demapper 260 for further handling by the P/S converter. The corresponding constellation vector is subtracted from the receive frequency-sample, and the result is returned to the demodulator controller 250 for further statistical characterization.

Possibly, error correction can be applied to the decoded binary words before the corresponding constellation vectors are subtracted from the receive frequency-samples.

As an alternative to this iterative demodulation process, the demapper 260 can demodulate the equalized received frequency-samples R'k,l in one-pass using the appropriate constellation diagram once the modulation parameters {Pj,l; Qj,l} have been determined by the demodulation controller 250.

The P/S converter 270 is for re-constructing the original DTus from the individually decoded bit-pair values output by the demapper 260, and for serializing the re-constructed DTus.

The descrambler 280 is for restoring the original DTus.

The deframer 290 reassembles the DTU payloads into one single binary stream.

The deframer 290 first checks whether a received DTus is valid or corrupted by means of the appended parity bits. The corrupted DTUS are discarded by the receiver.

The deframer 290 accommodates ARQ logic for acknowledging correct receipt of DTus to the peer transmitter. unacknowledged DTus are expected to be re-transmitted by the transmitter.

The resulting binary stream, once complete, is pushed into the receive buffer 300 for further reading by the higher layers.

Figure 3:
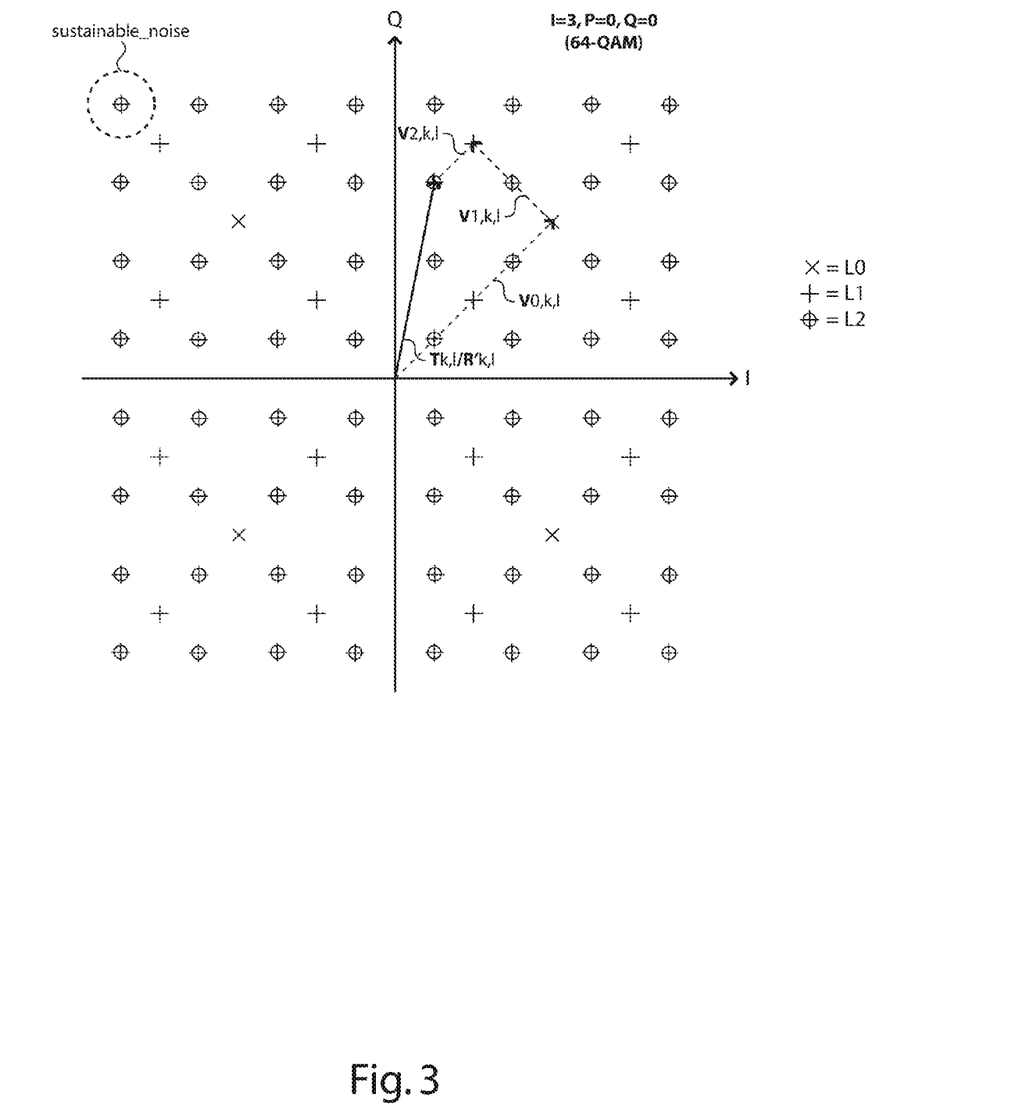
FIGS. 3 to 5 represents possible hierarchical group constellation diagrams for use by the transmitter and the receiver.
Figure 4:
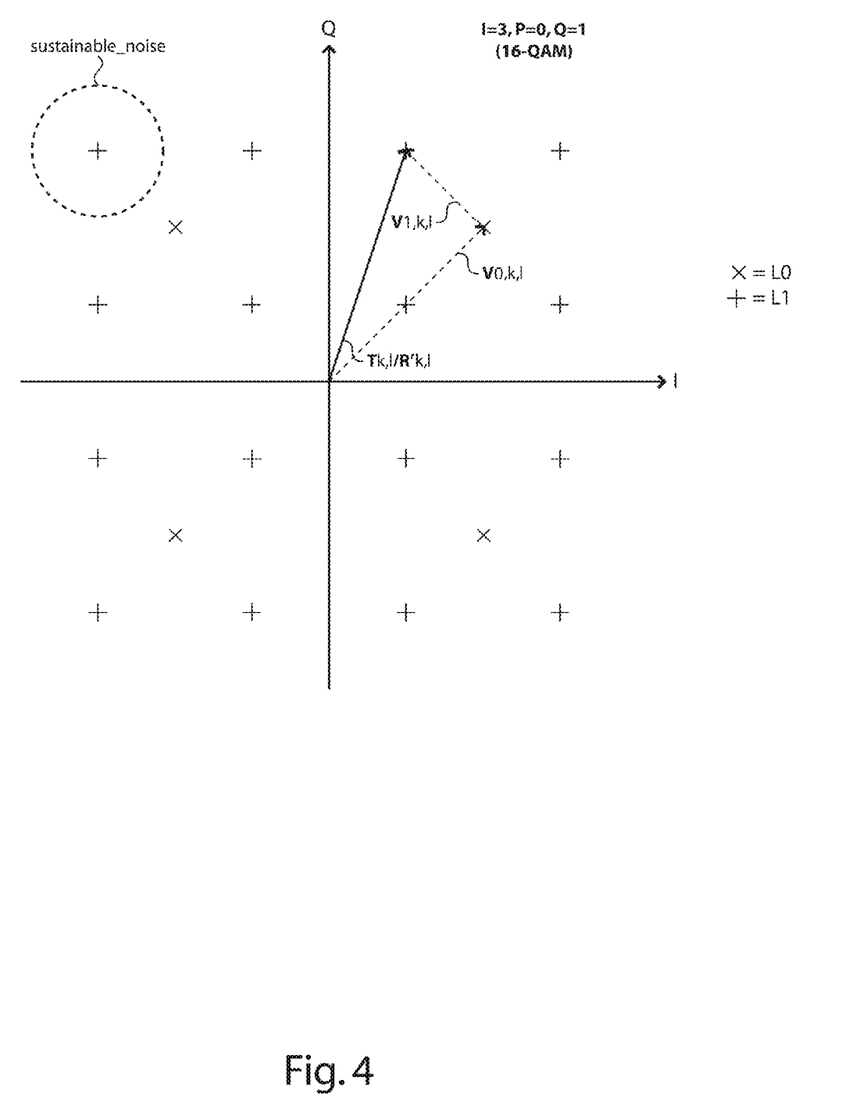
Figure 5:
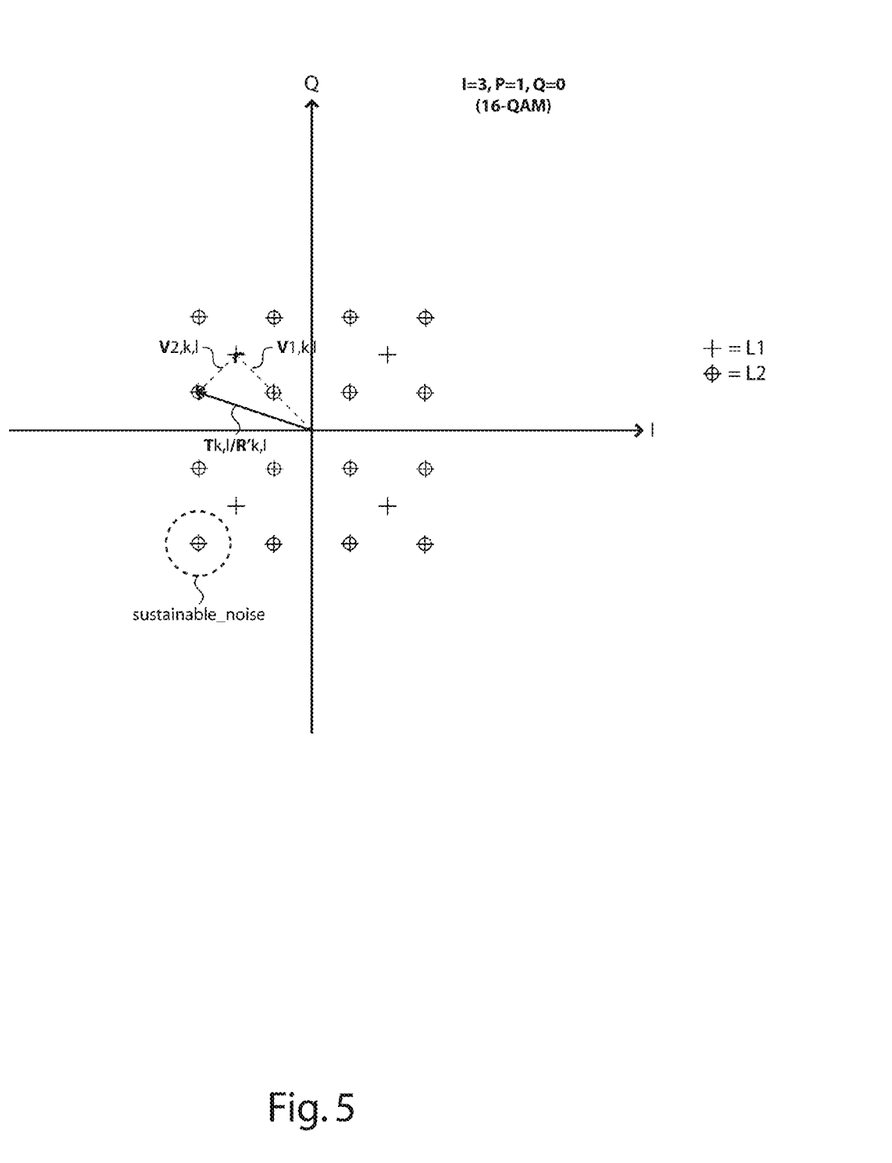

There is seen in FIGS. 3 to 5 three exemplary constellation diagrams that can be used for carrier modulation and demodulation. The maximum number of modulation layers is assumed to be 3 (I=3).

There is seen in FIG. 3 a first 64-QAM constellation diagram (6 bits per carrier) corresponding to the use case I=3 and P=Q=0, meaning all three modulation layers L0, L1 and L2 are in use.

The transmit frequency-samples Tk,l, or the equalized receive frequency-samples R'k,l, is the sum of 3 constellation vectors: V0,k,l for modulation layer L0, V1,k,l for modulation layer L1, and V2,k,l for modulation layer L2.

The power ratio α between two constellation vectors belonging to two successive modulation layers is equal to 4, or alternatively:

$$\|V_{0,k,l}\| = \|V_0\|, \|V_{1,k,l}\| = \frac{\|V_0\|}{2}, \|V_{2,k,l}\| = \frac{\|V_0\|}{4}. \quad (11)$$

The first modulation layer L0 has the highest transmission power, and corresponds to constellation points 'x'. The second modulation layer L1 has ¼th of the transmission power of the first modulation layer L0, and corresponds to constellation points '+'. And last, the third modulation layer L2 has ¹⁄₁₆th of the transmission power of the first modulation layer L0, and corresponds to constellation points '+' encircled. A sustainable noise power for that constellation diagram has been depicted as a noise cloud around one constellation point (see sustainable_noise in FIG. 3).

There is seen in FIG. 4 a second 16-QAM constellation diagram (4 bits per carrier), wherein I=3, P=0 and Q=1, meaning only the highest two modulation layers L0 and L1 are in use.

The transmit frequency-samples Tk,l, or the equalized receive frequency-samples R'k,l, is now the sum of 2 constellation vectors: V0,k,l for modulation layer L0, and V1,k,l for modulation layer L1. V2,k,l constellation vector is omitted.

This constellation diagram is able to sustain a higher noise power at the expense of a lower bit loading.

There is seen in FIG. 5 a third 16-QAM constellation diagram (4 bits per carrier), wherein I=3, P=1 and Q=0, meaning only the lowest two modulation layers L1 and L2 are in use.

The transmit frequency-samples Tk,l, or the equalized receive frequency-samples R'k,l, is the sum of 2 constellation vectors: V1,k,l for modulation layer L1, and V2,k,l for modulation layer L2. V0,k,l constellation vector is omitted.

This constellation diagram is able to sustain the same noise power as the constellation diagram of FIG. 3 (P=Q=0), yet with less transmit power.

Figure 6:
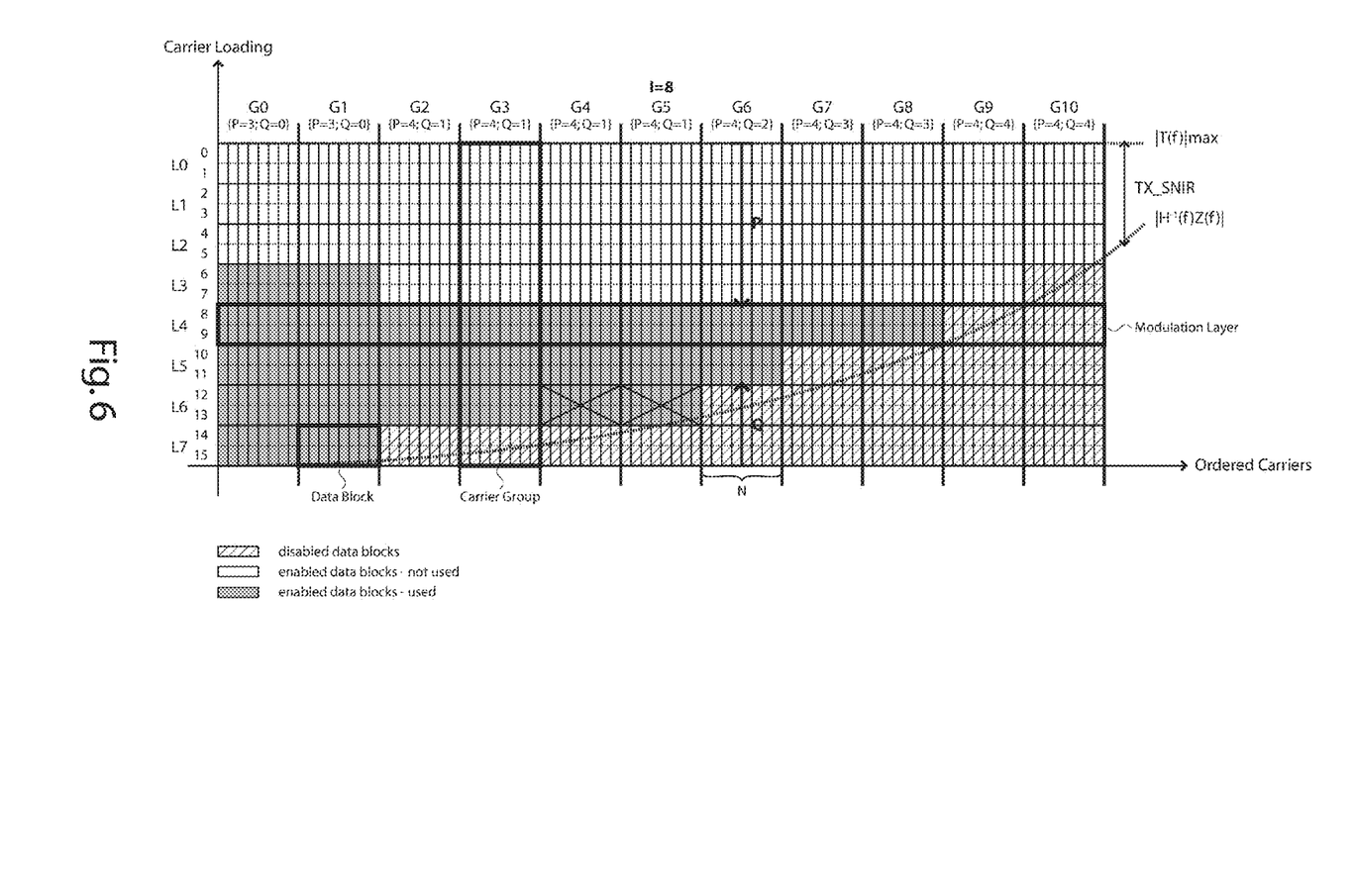
FIGS. 6 and 7 represents possible carrier loading policies.
Figure 7:
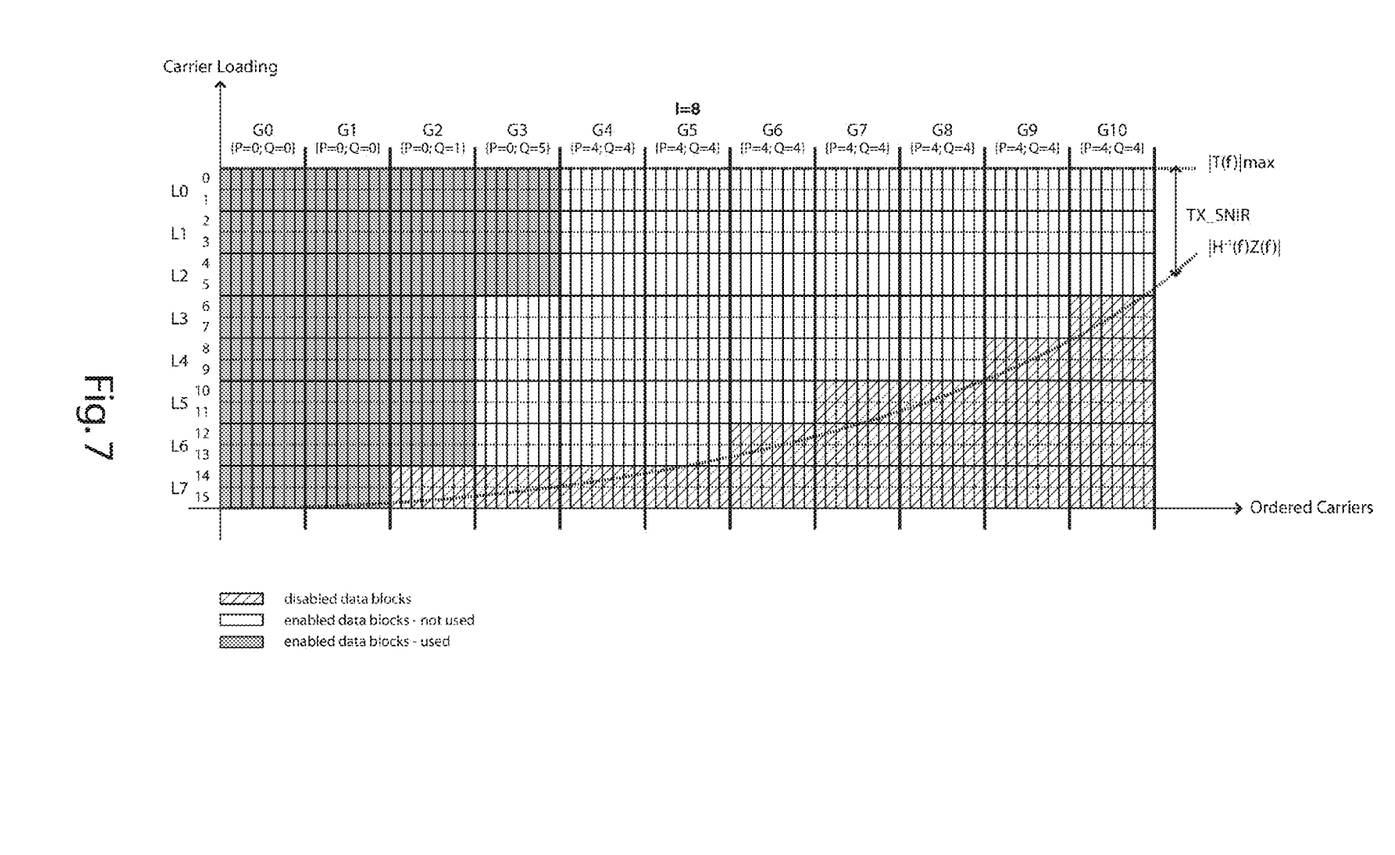

There is seen in FIGS. 6 and 7 two exemplary carrier loadings according to the invention. The maximum number of modulation layers is assumed to be 8 (I=8).

There is seen in FIG. 6 a plot representing respective carrier bit loadings for a given multi-carrier data symbol.

A maximum of 16 bits can be pair-wise loaded on a given carrier: {b0; b1} corresponds to the modulation layer L0; {b2; b3} corresponds to the modulation layer L1; {b4; b5} corresponds to the modulation layer L2; {b6; b7} corresponds to the modulation layer L3; {b8; b9} corresponds to the modulation layer L4; {b10; b11} corresponds to the modulation layer L5; {b12; b13} corresponds to the modulation layer L6; and {b14; b15} corresponds to the modulation layer L7.

Each modulation layer corresponds to a given transmit power budget. The maximum achievable transmit power is depicted as |T(f)|max. The maximum achievable SNIR TX_SNIR_MAX is depicted as being the difference between |H−1(f)Z(f)| and |T(f)| max, and is indicative of the maximum number of bits that can be loaded on a given carrier. Individual carrier scaling has been purposely omitted so as to not overload the plot.

The carriers are ordered according to their respective SNIR ratio, or equivalently according to their maximum achievable bit loading. The carriers are grouped into carrier groups, the carrier groups comprising a fixed number N of carriers. A given modulation layer for a given carrier group corresponds to a given data block and to a given DTU. A data block is able to convey 2N bits.

The data blocks that are disabled on account of the current noise level, and that cannot be used to convey any DTUs, are cross-hatched. The enabled data blocks that are used in the multi-carrier data symbol for conveying DTUs are gray-colored, while the enabled data blocks that are left unused in the multi-carrier data symbol are white-colored (yet they can be used in a subsequent or previous multi-carrier data symbol).

A first example of carrier loading policy is depicted in FIG. 6. In this example, the least transmission power is used to convey a certain amount of data. The lowest modulation layer L7 is first filled in, next the modulation layers L6, L5, etc. In this use case, the transmitter adjusts the modulation parameters {P; Q} per carrier group so as to match the amount of traffic that needs to be sent over that multi-carrier data symbol, presently 26 data blocks or 52N bits, while staying above the noise floor |H−1(f)Z(f)|. For instance, the modulation parameters {P; Q} are respectively set to {3; 0} for the first two carrier groups G0 and G1, and to {4; 1} for the subsequent four carrier groups G2 to G5, and so on.

The transmitter may also use ARQ statistics to adjust Q parameter. For instance, let us assume that two data blocks have been reported by the ARQ logic as being regularly hit by noise bursts leading to erroneous DTus and re-transmission events. Those data blocks are indicated in FIG. 6 by a cross (modulation layer L6 for carrier groups G4 and G5). Then, the transmitter will increase Q from 1 to 2 for carrier groups G4 and G5 so as to make the communication more resilient. If an equal amount of data is to be conveyed, it has to be compensated by a P decrease of one for two carrier groups, for instance for carrier group G2 and G3.

A second example of carrier loading policy is depicted in FIG. 6. In this example, all enabled data blocks of carrier group G0 are first filled in, next all enabled data blocks of carrier group G1, etc. Again, the transmitter adjusts the modulation parameters {P; Q} per carrier group so as to match the amount of traffic that needs to be sent while staying above the noise floor |H−1(f)Z(f)|. This policy is further advantageous as it only makes use of a limited portion of the available spectrum. The remaining portion of the spectrum can be used by other transmitters with which the interference level is substantial (for instance, because the corresponding subscriber lines are in close vicinity within a common binder). Some kind of scheduling coordination between multiple transmitters would then be advantageous.

In an alternative embodiment, a statistical hypothesis test, and more specifically the single sample Kolmogorov-Smirnov (K-S) goodness-of-fit hypothesis test, is used to guess the value of Q parameter.

A statistical hypothesis test is a method of making decisions using data, whether from a controlled experiment or an observational study (not controlled). In statistics, a result is called statistically significant if it is unlikely to have occurred by chance alone, according to a pre-determined threshold probability, the significance level.

[H, P]=KSTEST(X,CDF) performs a K-S test to determine if a random sample x could have the hypothesized, continuous Cumulative Distribution Function (CDF). CDF is optional: if omitted or empty, the hypothetical CDF is assumed to be a standard normal N(0,1). The H-value indicates the result of the hypothesis test: H=0 mean "Do not reject the null hypothesis at the specified significance level"; and H=1 means "Reject the null hypothesis at the specified significance level". The P-value is the probability of obtaining a test statistic at least as extreme as the one that was actually observed, assuming that the null hypothesis is true. Hence, it signifies how probable it is that the test statistic is derived from the hypothesis H=0.

Let S(X) be the empirical CDF estimated from the sample vector X, F(X) be the corresponding true but unknown population CDF, and CDFref be the known input CDF specified under the null hypothesis. The one-sample K-S test tests the null hypothesis that F(X)=CDFref for all X.

We know that the received samples are equal to the transmitted samples plus Additive White Gaussian Noise (AWGN) for both the in-phase and quadrature component. The AWGN follows a normal distribution with mean 0 and a variance equal to the observed noise power. The noise power can for instance be measured on known symbols with pre-defined patterns, such as SYNC symbols. Hence, when the demapping in the receiver is performed without errors, the distribution of the slicer errors approximates an AWGN. Demapping at the receiver is performed errorless when 1) the correct demapping grid is used, and 2) the noise power is limited. Hence, under the assumption that the demapping is performed errorless, the K-S test will be able to calculate the probability that the observed slicer errors in the in-phase and quadrature domains follow the hypothesized normal distribution with zero mean and a variance equal to the noise power.

As we know that in-phase and quadrature components follow the same distribution (except for phase noise) and constellation grid (because they are derived from a symmetrical 4-QAM constellation), we can group the in-phase and quadrature components in the same bin. This way, we can increase the sample size by two (for a carrier group of N carriers, we have 2N observations). As we know that one of the hypothesized constellation grids is used, we don't rely on the H-value of the K-S test. Rather, the estimated Q will be the Q that maximizes the P-value of the K-S test.

Alternatively, we could also compare the critical values of the K-S statistic which are output by the K-S test between the distributions, which could improve performance as the slicing will slightly alter the hypothesized distribution (zero probability outside [−d/2,d/2], where d is the nearest neighbor distance in the considered constellation diagram).

Still alternatively, one can play on the fact that the mean of the slicer error should be zero by calculating the mean of the samples. The constellation grid that yields the smallest mean(slicer_error)/F, where F is a normalization to reflect the different d of the grids (typically, one would select F=d/2), is selected as the Q estimate. Furthermore, we can play on the variance of the slicer error and select the mean variance of the slicer error, under the assumption that the mean should be 0. Again, we use a normalization F(Q), which is dependent on the Q value of the considered constellation.

The differentiation between the slicer distributions of different P values is too small to provide good (and hence, significant) detection. As P plays on the power of the signal, one uses this attribute for estimating P parameter. To avoid looping over all the constellations, one restricts oneself to one constellation grid. The assumption is that an amplitude scaling factor of 2 is used, and the constellation points of the (P; Q) constellation grids overlap when the same Q value is used. Under the assumption of perfect source coding, all constellation points of the selected (P; Q) grid should be equally often used. As the (P; Q) constellation grids for P= 1 . . . I−1 are a sub-grid of the (0; Q) grid, they will have a different distribution of demapped points. For instance, when I=2, the (1; 0) grid is using the four inner points of the (0; 0) grid. Rather than evaluating all the points individually, we propose to bin the demapped constellation points according to the layer to which they belong. Hence, we can do an exact binomial or chi-square hypothesis test to detect the probability to observe the sample distribution, under the null hypothesis, which is the considered constellation grid. For instance, when the transmitter is sending on the (0; 0) grid and assuming a low noise power, one would easily detect the fact that P=0, i.e. when one of the outer points is used.

It is to be noticed that P and Q parameters do not need to be both evaluated by statistical characterization of the received frequency-samples. For instance, the receiver may use a minimal Q value Qmin for demodulation of carriers of a given carrier group, which minimal value being determined according to the measured SNIR over that carrier group. Then, the receiver will decode invalid DTus for Qj,l-Qmin data blocks. If so, the receiver discards them, and no re-transmission takes place as they are not referenced at the transmit side.

Although the above description applies to wireline transmission, the proposed modulation and demodulation scheme is equally valid and advantageous for wireless and mobile transmission.

It is to be further noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

The invention claimed is:

1. A method for encoding a binary stream into multi-carrier data symbols, the method comprising:
    grouping a plurality of carriers into a plurality of carrier groups, each of the plurality of carrier groups including a separate selection of the plurality of carriers; and
    iteratively performing, for each carrier group of the plurality of carrier groups,
        for a given carrier group including N carriers, selecting a group constellation diagram for modulation of the N carriers of the given carrier group, the selected group constellation diagram including constellation points defined as respective hierarchical sums of I super-imposed constellation vectors having pre-defined decreasing powers with the P strongest constellation vectors and the Q weakest constellation vectors being omitted, P being a positive integer parameter, Q being a positive integer parameter, and I being a positive integer value that determines a maximum constellation size; and
        mapping N binary words for the respective N carriers of the given carrier group onto N respective constellation points of the selected group constellation diagram, with the P and Q parameters remaining unchanged for the given carrier group and being adjusted to their optimal value per carrier group and per multi-carrier data symbol.

2. The method according to claim 1, wherein the P parameter is adjusted according to a power budget criterion.

3. The method according to claim 1, wherein the Q parameter is adjusted according to a noise criterion.

4. The method according to claim 1, wherein the Q parameter is adjusted according to acknowledgment information from a peer receiver.

5. The method according to claim 1, wherein at least one parameter of the P and Q parameters is adjusted according to a Quality of Service QoS criterion.

6. The method according to claim 1, wherein at least one parameter of the P and Q parameters is adjusted according to outgoing traffic demand.

7. The method according to claim 1, wherein the I super-imposed constellation vectors are 4-QAM vectors.

8. The method according to claim 1, wherein carrier transmit powers are individually shaped in accordance with a transmit power spectral mask and/or are individually fine-tuned according to respective relative carrier gains.

9. The method according to claim 1, further comprising:
scrambling the binary stream prior to mapping the N binary words onto the N respective constellation points.

10. A method for blindly decoding a binary stream from multi-carrier data symbols, and comprising, at a receive side:
grouping a plurality of carriers into a plurality of carrier groups, each of the plurality of carrier groups including a separate selection of the plurality of carriers;
iteratively performing, for each carrier group of the plurality of carrier groups,
for a given carrier group including N carriers, selecting a group constellation diagram for demodulation of the N carriers of the given carrier group by statistical characterization of the N carriers or part thereof, the selected group constellation diagram including constellation points defined as respective hierarchical sums of I super-imposed constellation vectors having decreasing powers with the P strongest constellation vectors and the Q weakest constellation vectors being omitted, P being a positive integer parameter, Q being a positive integer parameter, I being a positive integer value that determines a maximum constellation size; and
de-mapping the respective N carriers of the given carrier group into N respective binary words based on the selected group constellation diagram, with the P and Q parameters remaining unchanged for the given carrier group and being re-evaluated per carrier group and per multi-carrier data symbol.

11. The method according to claim 10, further comprising:
evaluating at least one parameter of the P and Q parameters by statistical characterization of at least one of a power distribution or amplitude distribution of at least a portion of the N carriers.

12. The method according to claims 10, wherein the I super-imposed constellation vectors are 4-QAM vectors.

13. A transmitter comprising:
a processor configured to,
group a plurality of carriers into a plurality of carrier groups, each of the plurality of carrier groups including a separate selection of the plurality of carriers;
iteratively perform, for each carrier group of the plurality of carrier groups,
for a given carrier group including N carriers, select a group constellation diagram for modulation of the N carriers of the given carrier group, the selected group constellation diagram including constellation points defined as respective hierarchical sums of I super-imposed constellation vectors having decreasing powers with the P strongest constellation vectors and the Q weakest constellation vectors being omitted, P being a positive integer parameter, Q being a positive integer parameter, and I being a positive integer value that determines a maximum constellation size; and
map N binary words for respective N carriers of the given carrier group onto N respective constellation points of the selected constellation diagram, with the P and Q parameters remaining unchanged for the given carrier group and being adjusted to their optimal value per carrier group and per multi-carrier data symbol.

14. A receiver comprising:
a processor configured to,
group a plurality of carriers into a plurality of carrier groups, each of the plurality of carrier groups including a separate selection of the plurality of carriers;
iteratively perform, for each carrier group of the plurality of carrier groups,
for a given carrier group including N carriers, select a group constellation diagram for demodulation of the N carriers of the given carrier group by statistical characterization of the N carriers or part thereof, the selected group constellation diagram including constellation points defined as respective hierarchical sums of I super-imposed constellation vectors having decreasing powers with the P strongest constellation vectors and the Q weakest constellation vectors being omitted, P being a positive integer parameter, Q being a positive integer parameter, I being a positive integer value that determines a maximum constellation size; and
de-map the respective N carriers of the given carrier group into N respective binary words based on the selected group constellation diagram, with the P and Q parameters remaining unchanged for the given carrier group and being re-evaluated per carrier group and per multi-carrier data symbol.

* * * * *